US011355754B2

(12) United States Patent
Mao et al.

(10) Patent No.: US 11,355,754 B2
(45) Date of Patent: Jun. 7, 2022

(54) CARBON-BOUND POLYSULFIDE POSITIVE ELECTRODE MATERIALS FOR BATTERIES

(71) Applicant: PHILLIPS 66 COMPANY, Houston, TX (US)

(72) Inventors: Zhenhua Mao, Bartlesville, OK (US); Bill Greg Poling, Pensacola, FL (US); Christopher J. LaFrancois, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 221 days.

(21) Appl. No.: 16/742,462

(22) Filed: Jan. 14, 2020

(65) Prior Publication Data

US 2021/0218027 A1    Jul. 15, 2021

(51) Int. Cl.
*H01M 4/58* (2010.01)
*H01M 10/052* (2010.01)
*H01M 4/04* (2006.01)
*H01M 4/1397* (2010.01)
*H01M 4/1393* (2010.01)
*H01M 10/058* (2010.01)
*H01M 4/02* (2006.01)

(52) U.S. Cl.
CPC ....... *H01M 4/5815* (2013.01); *H01M 4/0404* (2013.01); *H01M 4/1397* (2013.01); *H01M 10/052* (2013.01); *H01M 10/058* (2013.01); H01M 4/0471 (2013.01); H01M 4/1393 (2013.01); H01M 2004/021 (2013.01); H01M 2004/028 (2013.01)

(58) Field of Classification Search
CPC ............. H01M 4/5815; H01M 4/0404; H01M 4/1397; H01M 4/0471; H01M 4/1393; H01M 10/052; H01M 10/058; H01M 2004/021; H01M 2004/028
See application file for complete search history.

(56) References Cited

U.S. PATENT DOCUMENTS

2018/0138503 A1*  5/2018  Kim .................. H01M 4/587

FOREIGN PATENT DOCUMENTS

WO        2016019901        2/2016

OTHER PUBLICATIONS

Morgan, Peter. (2005). Carbon Fibers and Their Composites—2.4.2.3 Synthetic Graphite. Taylor & Francis. (Year: 2005).*

(Continued)

*Primary Examiner* — Christopher P Domone
*Assistant Examiner* — Kimberly Wyluda
(74) *Attorney, Agent, or Firm* — Phillips 66 Company

(57) ABSTRACT

A process for binding sulfur to carbon to form carbon polysulfide is described that better secures sulfur to the cathode in a lithium-sulfur battery during lithium oxidation and reduction. The process includes selecting a suitable carbon precursor, blending it with sulfur and an organic solvent and mill the combination to make a fine particle size mix and then driving off the solvent along with species that have been dissolved in the solvent. The remaining carbon precursor and sulfur are heated in an inert environment at a temperature between about 300° C. and about 550° C. to chemically bind the sulfur and the carbon to form carbon polysulfide suitable for use as a cathode powder in a lithium-sulfur battery.

20 Claims, 2 Drawing Sheets

(56) References Cited

OTHER PUBLICATIONS

Koppers. (2012). Safety Data Sheet for Petroleum Pitch Solid, (Year: 2012).*

Echa. (2007, see study period). Pitch, coal tar, high-temp. (Year: 2007).*

Patel, J. P. (2018). Chapter 3: Characterization, testing, and reinforcing materials of biodegradable composites. (Year: 2018).*

Patrick Bonnick, Erika Nagai and John Muldoon, "Lithium-Sulfur Batteries", Journal of the Electrochemical Society, vol. 165, 2018, pp. A6005-A6007.

Brian P. Williams and Yong Lak Joo, "Tunable Large Mesopores in Carbon Nanofiber Interlayers for High Rate Lithium Sulfur Batteries", Journal of the Electrochemical Society, vol. 163, 2016, pp. A-2745-A-2756.

Doron Aurbach, "Introduction to the Focus Issue on Lithium-Sulfur Batteries: Materials, Mechanisms, Modeling, and Applications", Journal of the Electrochemical Society, vol. 165, 2018, pp. Y1-Y1.

Wenduo Zeng, Zhao Wang, Mark Ming-Cheng Cheng, and K. Y. Simon Ng, "Structured Titanium Nitride Nanotube Arrays/Sulfur Composite as Cathode Materials for Advanced Lithium Sulfur Battery", Journal of the Electrochemical Society, vol. 165, 2018, pp. A1011-A-1018.

Ariel Rosenman, Ran Elazari, Gregory Salitra, Doron Aurbach and Arnd Garsuch, "Li-S Cathodes with Extended Cycle Life by Sulfur Encapsulation in Disordered Micro-Porous Carbon Powders", Journal of the Electrochemical Society, vol. 161, 2014, pp. A657-A662.

Yonggang Liu, Weikun Wang, Anbang Wang, Zhaoqing Jin, Hailei Zhao and Yusheng Yang, "A Polysulfide Reduction Accelerator—NiS2—Modified Sulfurized Polyacrylonitrile as a High Performance Cathode Material for Lithium—Sulfur Batteries", Journal of Materials Chemistry A, vol. 5, 2017, pp. 22120-22124.

Jiulin Wang, Jun Yang, Jingying Xie and Naixin Xu, A Novel Conductive Polymer-Sulfur Composite Cathode Material for Rechargeable Lithium Batteries, Advanced Materials, vol. 14, 2002, pp. 963-965.

Andreas Hintennach, "Post Lithium-Ion Technologies: Novel and Sustainable Materials for Energy Storage", The Electrochemical Society, vol. MA2017-02, A04-Li-ion Batteries, 2017, 2 pages.

Jean Fanous, Marcus Wegner, Marcelle B. M. Spera and Michael R. Buchmeiser, "High Energy Density Poly (acrylonitrile)-Sulfur Composite-Based Lithium-Sulfur Batteries", Journal of the Electrochemical Society, vol. 160, 2013, pp. A1169-A1170.

Sven Warneke, Michael Eusterholz, Roland K. Zenn, Andreas Hintennach, Robert E. Dinnebier and Michael R. Buchmeiser, "Differences in Electrochemistry between Fibrous SPAN and Fibrous S/C Cathodes Relevant to Cycle Stability and Capacity", Journal of the Electrochemical Society, vol. 165, 2018, pp. A6017-A6020.

* cited by examiner

CARBON-BOUND POLYSULFIDE POSITIVE ELECTRODE MATERIALS FOR BATTERIES

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to the positive electrode in lithium sulfur battery systems and especially to the positive electrode materials containing sulfur upon which lithium ions are reduced during battery discharge.

BACKGROUND OF THE INVENTION

Lithium-ion batteries are currently well accepted high-power batteries used in many applications. However, for automotive applications, the charge capacity of lithium-ion batteries has been a concern, where battery weight and useful, single charge range are commonly discussed concerns. Basic lithium-sulfur battery chemistry has long been recognized for remarkably high-power storage and delivery capabilities but has thus far not been commercially feasible. The theoretical charge capacity approaches five times that of lithium-ion technology so successful design of a commercial lithium sulfur battery would be very appealing.

There are a number of challenges for a commercially viable lithium sulfur battery, but the primary challenge is termed "polysulfide shuttle". In a perfect world, the lithium ions pass through the separator and plate on to the solid sulfur and forms solid and stable $Li_2S_8$ as the lithium ions are reduced by electrons flowing to the cathode through the circuit. As the density of lithium on the cathode increases it may ultimately form stable $Li_2S$. Unfortunately, as the lithium accumulates to the cathode, intermediate species of lithium and sulfur are dissolvable in the electrolyte where $Li_2S_6$, $Li_2S_4$, $Li_2S_3$ and $Li_2S_2$ are dissolvable in to the electrolyte. Once dissolved in the electrolyte, electrically active sulfur is lost to the battery in the form of these intermediate species but continue to undertake oxidation and reduction reactions while shuttling back and forth across the separator. As such, power in recharging is consumed, but no power is returned in as available electric power. Thus, the battery suffers fading, reduced charge capacity and eventual failure.

The primary focus for a solution to the polysulfide shuttle is to bind the sulfur with carbon on the solid cathode. However, sulfur swells when binding with lithium ions and shrinks when the lithium is reduced during recharging. Such shrinking and swelling breaks sulfur free from the carbon. One proposed solution is to use electrolytes that do not dissolve the intermediates. Much research and development are underway as there is a well-recognized need for extending battery range for automobile use.

BRIEF SUMMARY OF THE DISCLOSURE

The present embodiment relates to a process for binding sulfur with carbon to restrain the sulfur from dissolution in a lithium sulfur battery where the process includes selecting a carbon precursor material from at least one of petroleum, coal tar, or plant sources wherein the carbon precursor has an average molecular weight of at least 350 Da, a melting temperature of at least 200° C., and a carbon yield of at least 40 wt % and then combining, milling and mixing sulfur and the carbon precursor material from previous step along with an organic solvent to form a ground wet sulfur and carbon precursor mix having an average particle size of no more than 10 μm. The solvent is evaporated along with any dissolved species of the sulfur and carbon precursor mix at a temperature below the boiling point of the organic solvent and also below the melting temperature of sulfur to form a dry mix, the dry mix is heated at a temperature of between about 300° C. and about 550° C. in an inert environment to chemically bind the carbon with the sulfur to form carbon polysulfide for a duration that results in substantially all unbound sulfur to be driven off and the carbon polysulfide is used as the cathode in forming a lithium sulfur battery.

BRIEF DESCRIPTION OF THE DRAWINGS

A more complete understanding of the present invention and benefits thereof may be acquired by referring to the following descriptions taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
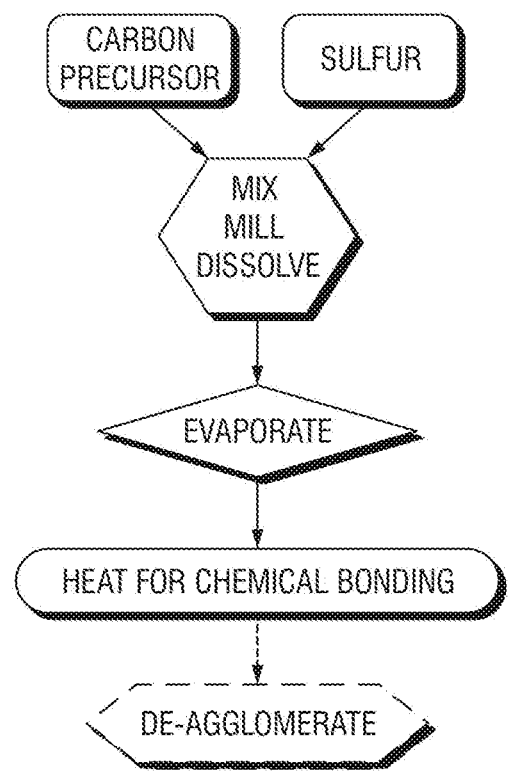
FIG. 1 is a process flow diagram showing the inventive process.

As described in the Background, one solution to the problem of polysulfide shuttling is to create a carbon-bound polysulfide. Apparently, not all carbon-bound polysulfides are created equal. Turning to FIG. 1, the inventive process is shown where a heavy aromatic carbon precursor is selected and combined with sulfur. The carbon precursor may be sourced from petroleum, coal tar, or plant sources where a heavy aromatic petroleum pitch is preferred, but green coke and lignin are also suitable. The carbon precursor preferably has an average molecular weight of at least 350 Da, a melting temperature of at least 200° C. although higher melting temperatures of at least 300° C. and at least 400° C. are each more preferred. The carbon yield of the carbon precursor should be at least 40 wt % but higher yield is more preferred such as at least 70 wt %, but should be below 95%, and more preferably below 90%.

Continuing with the description of the inventive process, the sulfur and carbon precursor are mixed, milled or ground and combined with an organic solvent. The order of these is preferably concurrent, but can occur in a more sequential order where, for example, the sulfur and carbon precursor can be mixed and then supplied with the organic solvent and then milled or the organic solvent can be added after milling has begun. The organic solvent dissolves a portion of the carbon precursor, but the whole mixture is wet like a thick paste or slurry (containing solids). A preferred list of organic solvents would include toluene, xylene, carbon disulfide, acetone, benzene, light petroleum oils and combinations thereof.

The milling or grinding occurs in a mechanical milling device that uses ball milling most preferably, but jet milling and other known milling technologies that reduce the particle size down to micron sizes would be suitable assuming that it could work on a wet mixture.

The mix is milled so that the solids are reduced to particles having an average size of no more than 10 μm, but more preferably down to 5 μm and smaller would be more preferred such as down to 3 μm or even 2 μm. Rounded particles are preferred, but size measurements are taken typically by the longest dimension of amorphous shaped particles. And these numbers are average size so that the powder has high surface area and high available lithium plating area on the particles and within the cathode of a lithium sulfur battery.

After the milling is done, the solvent is evaporated along with any dissolved species of the sulfur and carbon precursor mix at a temperature below the boiling point of the organic solvent and also below the melting temperature of sulfur to form a dry mix. The step of evaporating the solvent may be conducted at a reduced atmospheric pressure to increase the rate at which the solvent evaporates.

Once dry, the dry mix is heated to a temperature of between about 300° C. and about 550° C. in an inert environment to chemically bind the carbon with the sulfur to form carbon polysulfide for a duration that results in substantially all unbound sulfur to be driven off. The temperature of the environment may be higher, and the listed temperature is the temperature of the dry mix. At that temperature, the sulfur and carbon precursor form a strong form of carbon polysulfide which is quite suitable and desirable as cathode powder in forming or making of a lithium sulfur battery.

An optional step is shown in dotted lines in FIG. 1 where the carbon polysulfide is de-agglomerated after the heating step to make sure that the average particle size has not grown to a less desirable dimension. Such de-agglomeration is done by milling such as ball milling or by a high shear mixer or other mechanical grinding or milling technology including jet milling.

EXAMPLES

The following examples of certain embodiments of the invention are given. Each example is provided by way of explanation of the invention, one of many embodiments of the invention, and the following examples should not be read to limit, or define, the scope of the invention.

The usefulness of carbon-bound polysulfide materials is assessed as the positive electrode material in a coin cell with lithium metal as the negative electrode. Several different examples were created with different cathode materials. For each cathode, the preparation procedure for an operative lithium-sulfur battery is described below:

For each sample of carbon-bound polysulfide (CBS) created, about 1 g of CBS powder was combined with 0.13 g of carbon black and 0.07 g of polyvinylidene difluoride (PVDF) in a 10 wt % solution in N-methyl pyrrolidinone (NMP) in a 25-ml plastic vial. The vials were shaken with about 3 g of ⅛" steel balls for 10 min in a ball mill to form a uniform paste.

A thin film of each resulting paste was cast on carbon-coated aluminum foil with a doctor-blade coater. The resulting film was placed in a vacuum oven and dried under vacuum at 85° C. for at least 2 h. The dried film was trimmed to a 5-cm wide strip and densified through a roller press. Three disks (1.5 cm in diameter) of each film were punched out with a die cutter as electrodes. The electrode weight was determined by subtracting the total weight of each disk by the weight of an equal sized aluminum foil disk. The electrode composition was 84 wt % CBS, 6 wt % PVDF, and 10 wt % carbon black, and the mass loading was about 6 mg/cm'.

Each of the cathode disks were then used to make a coin cell. Each coin cell consists (in sequence from bottom up) of a bottom can, lithium metal as the anode, a separator, a cathode disk, a stainless-steel disk spacer, a wave spring, and a top can, all in a stack. An electrolyte was added to the separator before the cathode disk was added to the stack. An electrolyte of 1 M LiPF6 in 40 vol % ethylene carbonate, 30 vol % dimethyl carbonate, and 30 vol % diethylene carbonate mixture was used. After the top can was added to the stack, the assembly was crimped together.

The electrochemical tests were performed on an electrochemical test station with the following charge/discharge test program: a) discharged at a constant current of 0.25 mA to 1.0 V, b) charged at the same constant current until the voltage reached 3.0 V and then at a constant voltage of 3.0 V for 1 h, and c) repeated steps a) and b) 50 times (50 cycles). The electrical charge passed during charging and discharging on each cycle was recorded and used to calculate the specific capacity and coulombic efficiency. In addition, the cell voltage profiles reflect the electrochemical behavior of the cathode material during charging and discharging. All the tests were conducted at ambient temperature and the cells were tested in a glove box where oxygen and moisture levels were measured at below 3 ppm.

Figure 2:
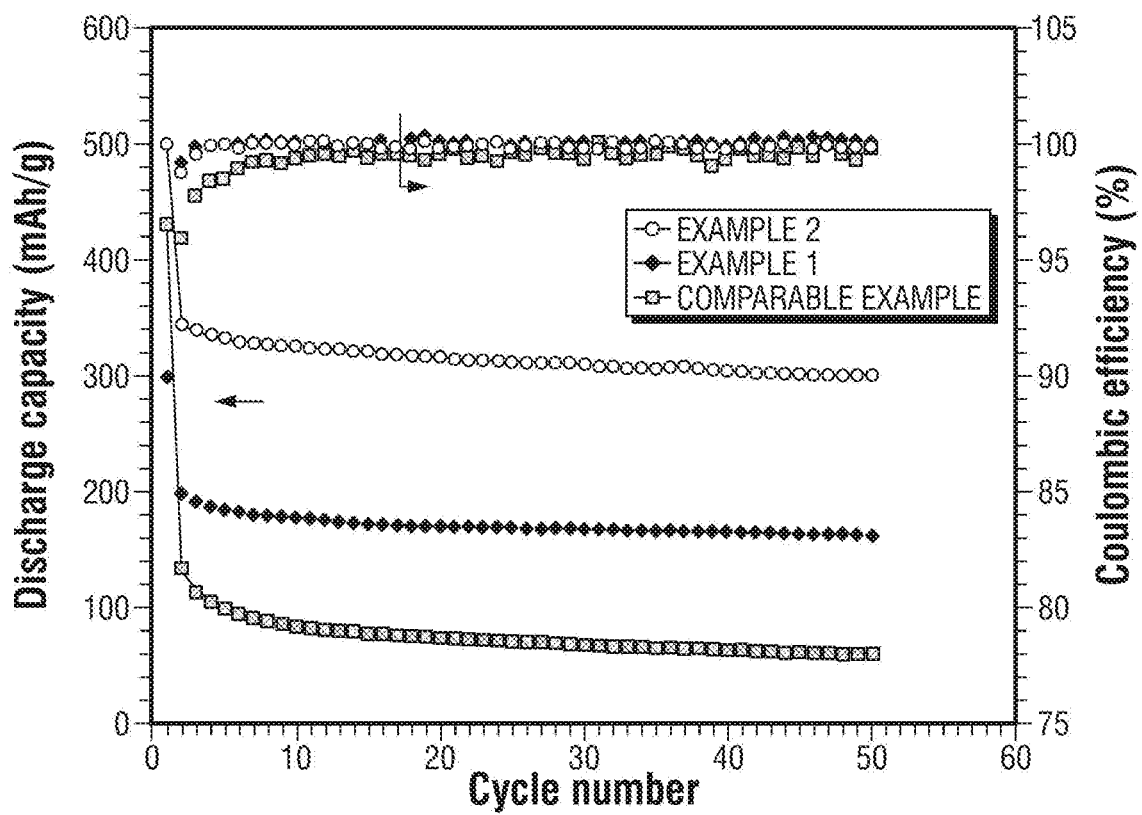
FIG. 2 is chart showing discharge capacity and coulombic efficiency for Examples 1 and 2 of the invention.

A comparative example was created for a baseline comparison. The comparative example was creating by mixing 2 grams of polyacrylonitrile having a molecular weight of 150,000 Da with 8 grams of sulfur and 20 grams of zirconia grinding beads having a diameter of 4 mm. The comparative mixture was placed in a 30 ml zirconia grinding vial and ball-milled together for 10 minutes in a laboratory high-energy ball-mill. The resulting mixture was placed in a 25 ml quartz crucible and transferred in a tube furnace. After the tube was fully purged with nitrogen gas, the heater was turned on to ramp temperature up at 5° C./m to 200° C., then 2° C./m up to a temperature of 350° C., then the temperature was held at 350° C. for two hours and ramped up again at 5° C./m to 450° C. and again held for 2 hours. The heater was then turned off and the furnace was cooled to ambient temperature. The resulting powder was reweighed weighing 3.2 grams. The resulting powder was ball-milled for 10 minutes with the same equipment and tested as the positive electrode material in a coin cell as described above. The respective discharge capacities and coulombic efficiencies are given in FIGS. 2 and 3. The sulfur content was 35 wt %.

Inventive Example 1

In the first inventive example, 2 grams of lignin were mixed with 8 grams of sulfur and 20 grams of zirconia grinding beads having a diameter of 4 mm and then processed in the same processing steps as the comparative example. The resulting powder was ball-milled for 10 minutes with the same equipment and tested as the positive electrode material in a coin cell as described above. The respective discharge capacities and coulombic efficiencies are given in FIGS. 2 and 3. The lignin had a carbon yield of 52 wt % and does not melt on heating. The resulting powder contained 31 wt % sulfur. The discharge capacities and coulombic efficiencies at different cycle number are presented in FIG. 2.

Inventive Example 2

A second inventive Example uses petroleum pitch as the carbon precursor. The melting point of the pitch was 350° C. and the carbon yield was 76 wt %. The resulting powder contained 54 wt % sulfur. The discharge capacities and coulombic efficiencies at different cycles are given in FIG. 2 for comparison.

Comparison of the discharge capacities for the above samples clearly elucidate that the lignin and petroleum pitch are superior to polyacrylonitrile as carbon precursor for making carbon-bound polysulfide as positive electrode material for batteries.

Inventive Example 3

In Inventive Example 3, the same petroleum pitch that was used example 2 was used again and instead of dry mixing, 20 grams of xylene were added to the pitch and sulfur mixture in the ball-milling operation. Sulfur is partially soluble in xylene; the pitch is not. Both sulfur and pitch particles are fully wet with xylene. After milling, the mixture was fully dried at 85° C. under vacuum for 2 hours. The dried mixture was heated under the same conditions as those in Comparative Example. The resulting powder contained 47 wt % sulfur. The initial discharge capacity and the discharge capacity and coulombic efficiency on the first recharge cycle is presented in FIGS. 3 and 4 for comparison.

Inventive Example 4

For Inventive Example 4, the same pitch was used again and instead of ball-milling/mixing, both sulfur and the pitch were dissolved in carbon disulfide at ambient temperature as both the materials are soluble to carbon disulfide. Carbon disulfide was evaporated at 45° C. under ambient pressure while the solution was agitated. The resulting dry mixture was heated in the same way as the others in the Examples. The resulting powder contained 52 wt % sulfur. The initial discharge capacity and the discharge capacity and coulombic efficiency on the first recharge cycle is compared with those of the other samples in FIGS. 3 and 4.

Figure 3:
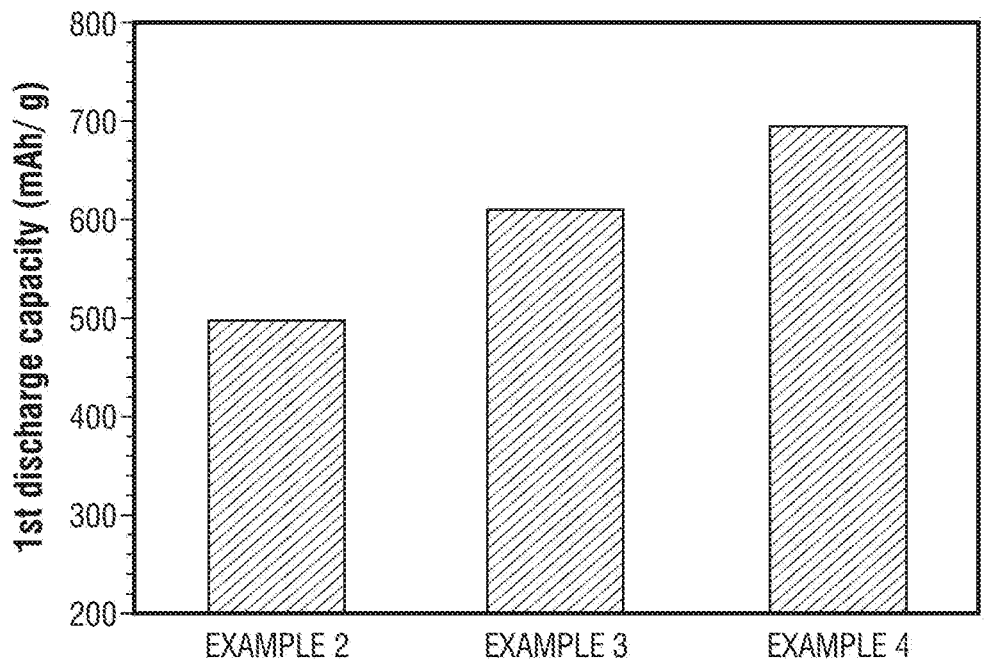
FIG. 3 is chart showing first discharge capacity of Examples 2, 3 and 4 of the present invention.
Figure 4:
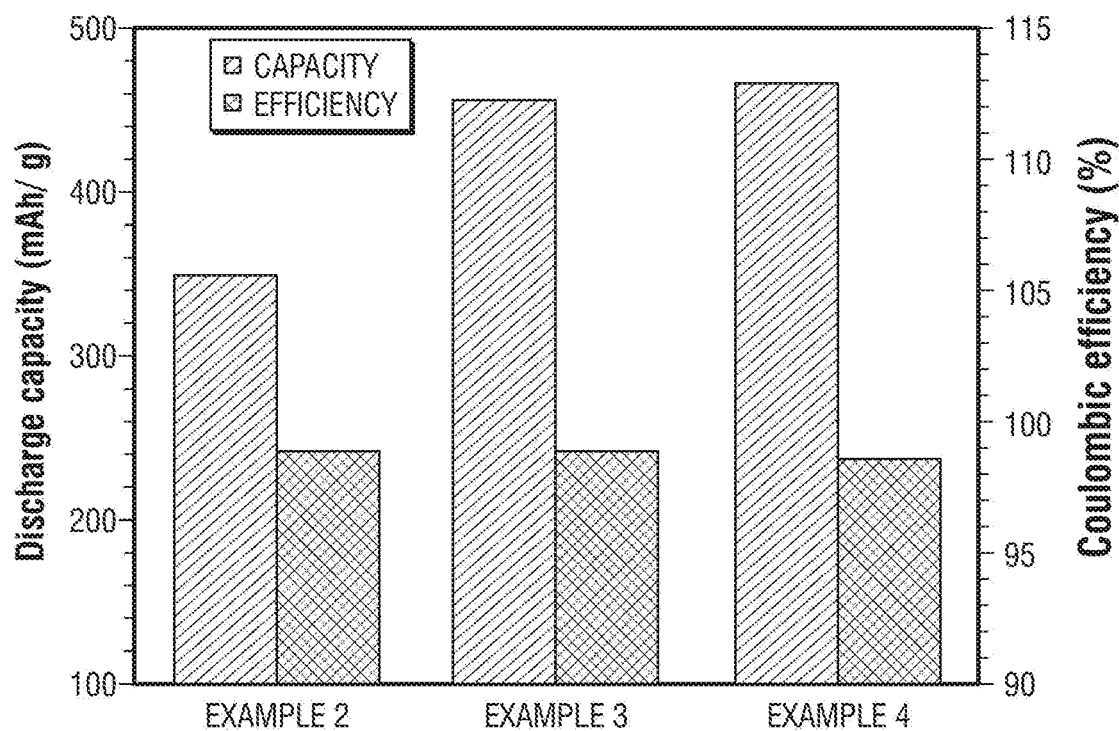
FIG. 4 is chart showing discharge capacity and coulombic efficiency for Examples 2, 3 and 4 of the present invention.

The comparisons in FIGS. 3 and 4 illustrate that use of organic solvent in milling/mixing sulfur and carbon precursor enhances electrochemical activity of the resulting carbon-bound polysulfide as the positive electrode material for lithium batteries.

Inventive Example 5

For Inventive Example 5, green petroleum coke was used as the carbon precursor and was prepared as described for Inventive Example 3. The selected green coke has a carbon yield of 88 wt %. The green coke was pre-crushed and milled to an average particle size of 11 μm before ball-milling with sulfur. The resulting powder contained 45 wt % sulfur. The initial discharge capacity was 600 mAh/g and the discharge capacity and coulombic efficiency on the first recharging cycle was 455 mAh/g and 99.2%, respectively. These values are comparable to those in Example 3.

The above examples have demonstrated that petroleum pitches, green cokes and lignins are superior to polyacrylonitrile as carbon precursor for carbon-bound polysulfide as positive electrode material for batteries. Such carbon precursors are by-products of petroleum refineries and the paper pulp industry. They are abundant and inexpensive compared to polyacrylonitrile; use of such carbon precursors for energy storage batteries would benefit the society in many aspects, including energy saving and sustainability.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for binding sulfur with carbon to restrain the sulfur from dissolution in a lithium-sulfur battery, wherein the process comprises:
    a) selecting a carbon precursor material from at least one of petroleum, coal tar, or plant sources wherein the carbon precursor has an average molecular weight of at least 350 Da, a melting temperature of at least 200° C., and a carbon yield of at least 40 wt %;
    b) combining, milling and mixing sulfur and the carbon precursor material from step (a) along with an organic solvent to form a ground wet sulfur and carbon precursor mix having an average particle size of no more than 10 μm;
    c) evaporating the solvent along with any dissolved species of the sulfur and carbon precursor mix at a temperature below the boiling point of the organic solvent and also below the melting temperature of sulfur to form a dry mix;
    d) heating the dry mix at a temperature of between about 300° C. and about 550° C. in an inert environment to chemically bind the carbon with the sulfur to form carbon polysulfide for a duration that results in substantially all unbound sulfur to be driven off; and
    e) using the carbon polysulfide as the cathode in forming a lithium-sulfur battery.

2. The process according to claim 1 wherein the carbon precursor material is a heavy aromatic petroleum pitch having a melting temperature of at least 300° C.

3. The process according to claim 1 wherein the carbon precursor material is a heavy aromatic petroleum pitch having a melting temperature of at least 400° C.

4. The process according to claim 1 wherein the carbon precursor material is a heavy aromatic petroleum pitch having a carbon yield of at least 70 wt %.

5. The process according to claim 1 wherein the carbon precursor material is a heavy aromatic green coke having a melting temperature of at least 300° C.

6. The process according to claim 1 wherein the carbon precursor material is a heavy aromatic green coke having a melting temperature of at least 400° C.

7. The process according to claim 1 wherein the carbon precursor material is a heavy aromatic green coke having a carbon yield of at least 70 wt %.

8. The process according to claim 1 wherein the carbon precursor material is a heavy aromatic lignin having a melting temperature of at least 300° C.

9. The process according to claim 1 wherein the carbon precursor material is a heavy aromatic lignin having a melting temperature of at least 400° C.

10. The process according to claim 1 wherein the carbon precursor material is a heavy aromatic lignin having a carbon yield of at least 70 wt %.

11. The process according to claim 1 wherein the solvent is selected from the group of toluene, xylene, carbon disulfide, acetone, benzene, light petroleum oils and combinations thereof.

12. The process according to claim 1 wherein the step of milling is ball milling and the carbon precursor material is concurrently thoroughly mixed with the sulfur.

13. The process according to claim 1 wherein the step of milling reduces the average particle size to no more than 5 μm.

14. The process according to claim 1 wherein the step of milling reduces the average particle size to no more than 2 μm.

15. The process according to claim 1 wherein the step of evaporating the solvent occurs at below atmospheric pressure to increase the rate at which the solvent evaporates.

16. The process according to claim 1 further including the step of grinding or de-agglomerating the carbon polysulfide such that the particle size of the carbon polysulfides is no more than 10 μm.

17. The process according to claim 16 wherein the step of grinding or de-agglomerating is accomplished in a mechanical high shear mixer.

18. The process according to claim 16 wherein the steps of milling the carbon precursor and sulfur set forth in step (b) and also the grinding or de-agglomerating the carbon polysulfide are accomplished by ball milling.

19. The process according to claim 1 further including the step of grinding or de-agglomerating the carbon polysulfide such that the particle size of the carbon polysulfides is no more than 5 μm.

20. A process for producing a lithium-sulfur battery, wherein the process comprises:
   a) selecting a hydrocarbon pitch material from at least one of petroleum, coal tar, or plant sources wherein the hydrocarbon pitch has an average molecular weight of at least 350 Da, a melting temperature of at least 200° C., and a carbon yield of at least 40 wt %;
   b) combining, milling and mixing sulfur and the hydrocarbon pitch material from step (a) along with an organic solvent to form a ground wet sulfur and pitch mix having an average particle size of no more than 10 μm;
   c) evaporating the solvent along with any dissolved species of the sulfur and pitch mix at a temperature below the boiling point of the organic solvent and also below the melting temperature of sulfur to form a dry mix;
   d) heating the dry mix at a temperature of between about 300° C. and about 550° C. in an inert environment to chemically bind the carbon with the sulfur to form carbon polysulfide for a duration that results in substantially all unbound sulfur to be driven off;
   e) forming a cathode with a layer of the carbon polysulfide from step (d); and
   f) assembling a lithium anode, an electrolyte, a separator and the cathode from step (e) to form a lithium-sulfur battery.

* * * * *